United States Patent
Hirose

(10) Patent No.: US 8,818,281 B2
(45) Date of Patent: Aug. 26, 2014

(54) DATA OUTPUT APPARATUS, METHOD OF CONTROLLING SAME AND OUTPUT SYSTEM

(75) Inventor: Takatoshi Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 12/988,628

(22) PCT Filed: Jun. 9, 2009

(86) PCT No.: PCT/JP2009/060967
§ 371 (c)(1),
(2), (4) Date: Oct. 19, 2010

(87) PCT Pub. No.: WO2010/001720
PCT Pub. Date: Jan. 7, 2010

(65) Prior Publication Data
US 2011/0045774 A1 Feb. 24, 2011

(30) Foreign Application Priority Data
Jun. 30, 2008 (JP) ................ 2008-171245

(51) Int. Cl.
*H04B 7/00* (2006.01)
(52) U.S. Cl.
USPC ...................... 455/41.3; 455/41.2
(58) Field of Classification Search
USPC ............ 455/63.1, 501, 39, 133, 275, 41.3, 455/277.1, 41.2
See application file for complete search history.

(56) References Cited

U.S. PATENT DOCUMENTS

| | | | |
|---|---|---|---|
| 7,236,755 B2 * | 6/2007 | Terai et al. | 455/150.1 |
| 7,305,496 B2 | 12/2007 | Ohnishi | |
| 7,701,904 B2 * | 4/2010 | Lee et al. | 370/331 |
| 2004/0267981 A1 | 12/2004 | Kakemura | |
| 2005/0127299 A1 | 6/2005 | Nagai et al. | |
| 2005/0237566 A1 | 10/2005 | Sakuda et al. | |

FOREIGN PATENT DOCUMENTS

| | | |
|---|---|---|
| CN | 1519733 A | 8/2004 |
| EP | 1429234 A2 | 6/2004 |
| EP | 1450264 A2 | 8/2004 |
| EP | 1538819 A1 | 6/2005 |
| JP | 8-195871 A | 7/1996 |
| JP | 10-124634 A | 5/1998 |
| JP | 2000-209653 A | 7/2000 |
| JP | 2005-223518 A | 8/2005 |
| KR | 10-2004-0109977 A | 12/2004 |

OTHER PUBLICATIONS

European Search Report dated Dec. 23, 2011 issued in corresponding European Patent Application No. 09773298.6.
Japanese Office Action dated May 14, 2012 issued in corresponding Japanese Patent Application No. 2008-171245.

(Continued)

*Primary Examiner* — Eugene Yun
(74) *Attorney, Agent, or Firm* — Fitzpatrick, Cella, Harper & Scinto

(57) ABSTRACT

In an image output apparatus for outputting an image supplied from an image supply apparatus, the image supply apparatus and the image output apparatus are connected wirelessly and send and receive data. The state of the wireless connection is determined and the image to be output is changed in accordance with the determined state of the connection.

14 Claims, 9 Drawing Sheets

(56) References Cited

OTHER PUBLICATIONS

U.S. Appl. No. 12/988,629, filed Oct. 19, 2010. Applicant: Takatoshi Hirose.

Chinese Office Action dated Nov. 12, 2012 issued in corresponding Chinese Patent Application No. 200980125324.5.
European Office Action dated Mar. 4, 2013 issued in corresponding European Patent Application No. 09773298.6.

* cited by examiner

DATA OUTPUT APPARATUS, METHOD OF CONTROLLING SAME AND OUTPUT SYSTEM

This application is a National Stage application under 35 U.S.C. §371 of International Application No. PCT/JP2009/060967, filed on Jun. 9, 2009, which claims priority to Japanese Application No. 2008-171245, filed on Jun. 30, 2008, the contents of each of the foregoing applications being incorporated by reference herein.

TECHNICAL FIELD

The present invention relates to a data output apparatus, a method of controlling this apparatus and an output system having this data output apparatus.

BACKGROUND ART

Radio Frequency Identification (REID) and Near-Field Communication (NFC) are available as technologies for implementing close-proximity wireless transfer between devices. A close-proximity wireless transfer technology referred to as "TransferJet" also is available. This transfer technology exercises control so as to establish a connection between devices when the communication distance is made short and sever the connection when the distance is lengthened.

Further, in order to transmit and print a saved image by wireless communication, it is required that the user performs a complicated operation, such as selection of the desired image. Techniques for automatic transmission of images have also been studied. The specification of Japanese Patent Laid-Open No 2005-223518 discloses a technique whereby an image supply apparatus, which has a number of image data files, and an image storage apparatus transfer image data files automatically using a wireless communication interface. In accordance with this technique, convenience on the part of the user can be enhanced.

However, the series of operations relating to transfer in the conventional wireless image output system has a technical problem concerning inadequate user convenience. Further, with the conventional technique described above, a technical problem which arises is that the user cannot select an image data file to be transferred.

DISCLOSURE OF INVENTION

The present invention provides an apparatus and method whereby data that is output by a data output apparatus can be changed in accordance with a change in the state of a wireless connection between an external apparatus and the data output apparatus.

According to one aspect of the present invention, there is provided a data output apparatus comprising: determination means for determining a change in state of a wireless connection with an external apparatus; and changing means for changing output data in accordance with the change in state of the connection determined by the determination means.

According to another aspect of the present invention, there is provided a method of controlling a data output apparatus, comprising: a determination step of determining a change in state of a wireless connection with an external apparatus; and a changing step of changing output data in accordance with the change in state of the connection determined at the determination step.

According to still another aspect of the present invention, there is provided an output system having an external apparatus and a data output apparatus, comprising: determination means for determining a change in state of a wireless connection between the external apparatus and the data output apparatus; and changing means for changing output data in accordance with the change in state of the connection determined by the determination means.

Further features of the present invention will become apparent from the following description of exemplary embodiments with reference to the attached drawings.

BEST MODE FOR CARRYING OUT THE INVENTION

Preferred embodiments of the present invention will now be described in detail with reference to the drawings.

Described as a first embodiment of the invention is an operation in which an image output apparatus of a wireless image output system using close-proximity wireless transfer technology transfers a plurality of image data files and changes the output image data in accordance with connect/disconnect of the close-proximity wireless transfer technology.

Figure 1:
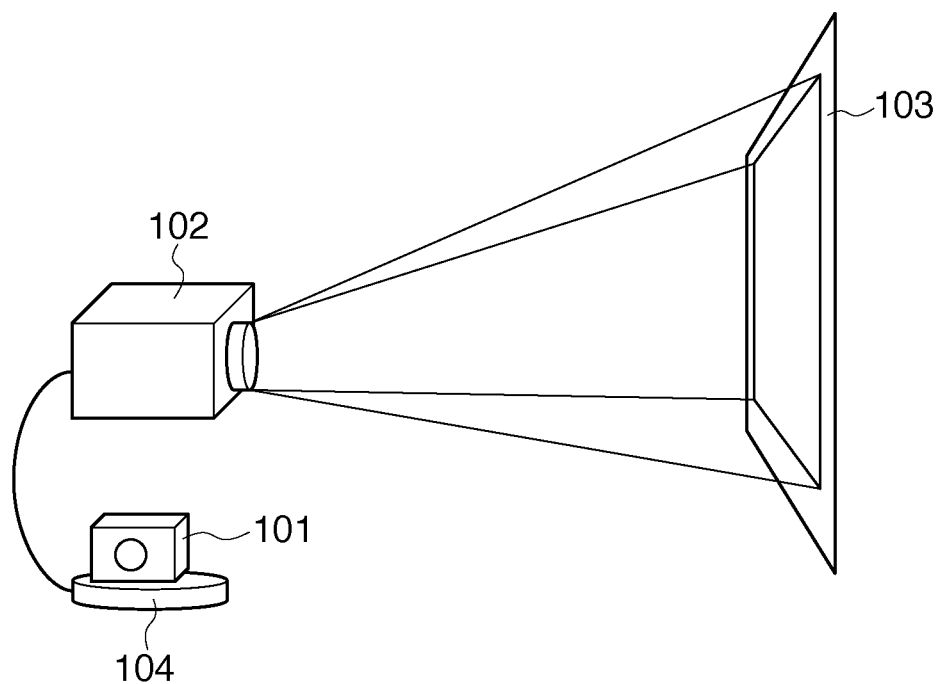
FIG. 1 is a diagram illustrating an example of the configuration of a wireless image output system according to a first embodiment of the present invention.

FIG. 1 is a diagram illustrating an example of the configuration of a wireless image output system according to the first embodiment. As illustrated in FIG. 1, the wireless image output system comprises a digital still camera 101 having a close-proximity wireless transfer function, a projector 102 and a screen 103. It should be noted that although a wireless port 104 having the close-proximity wireless transfer function has been connected to the projector 102 by a cable, the wireless port 104 may just as well be built in the projector 102.

Figure 2:
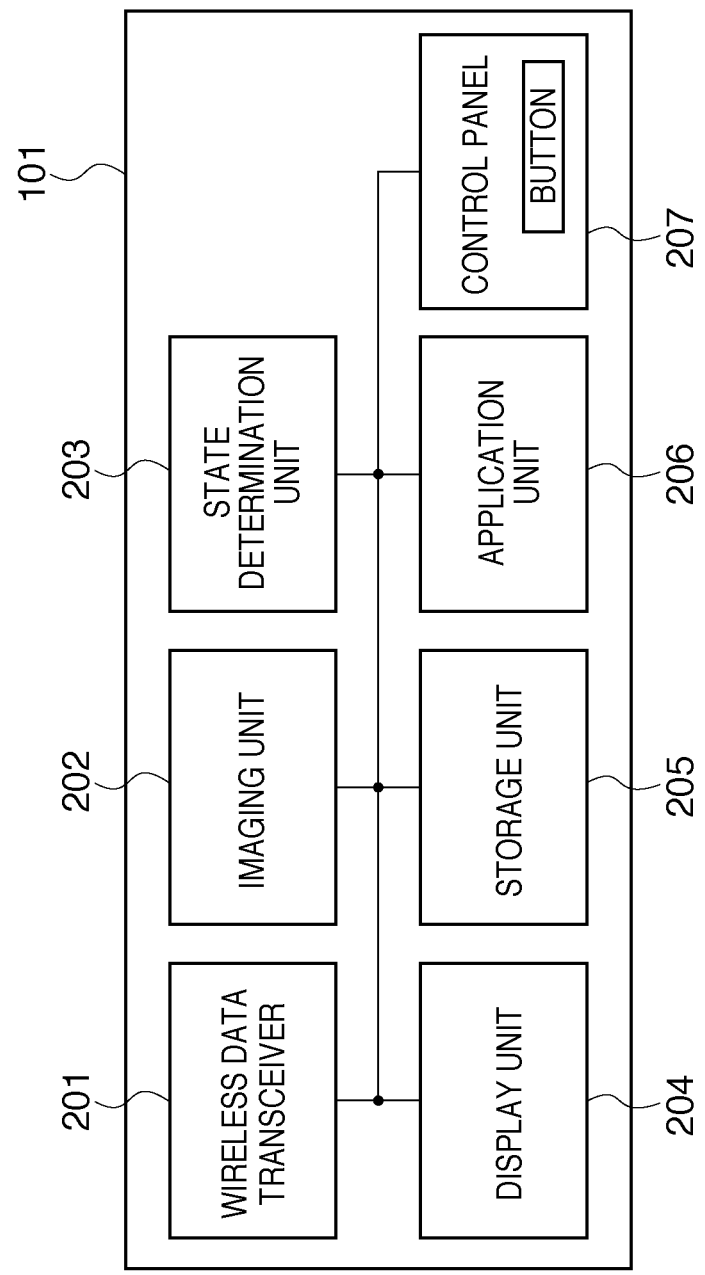
FIG. 2 is a diagram illustrating an example of the configuration of a digital still camera according to the first embodiment.

FIG. 2 is a diagram illustrating an example of the configuration of the digital still camera 101 according to the first embodiment. As shown in FIG. 2, a wireless data transceiver 201 sends and receives data wirelessly using close-proximity wireless transfer technology. An imaging unit 202 converts video of a subject imaged optically by a CCD to an electric signal and outputs the signal. A state determination unit 203, which includes a CPU for executing processing in accordance with a program and a peripheral circuit (timer), determines the state of the digital still camera (referred to simply as a "camera" below) 101. The details of the determination made by the state determination unit 203 will be described later.

A display unit 204 functions as a user interface for setting the camera 101 and displaying captured images. A storage unit 205 stores video, which has been captured by the imaging unit 202, as an image data file. An application unit 206 includes application software for causing the camera 101 to function as an image supply apparatus and supplies the image data file to the projector 102 in cooperation with the wireless data transceiver 201. A control panel 207 has various buttons for allowing the user to operate the camera.

Figure 3:
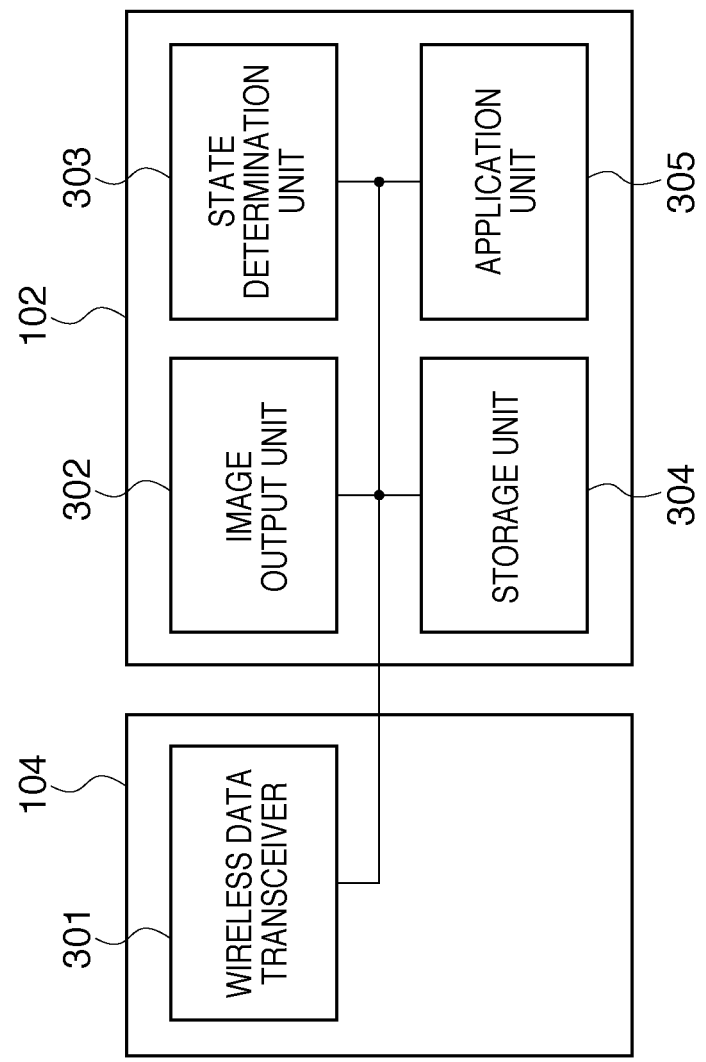
FIG. 3 is a diagram illustrating an example of the configuration of a projector and wireless port in the first embodiment.

FIG. 3 is a diagram illustrating an example of the configuration of the projector 102 and wireless port 104 in the first embodiment. As shown in FIG. 3, a wireless data transceiver 301 of the wireless port 104 sends and receives data wirelessly in a manner similar to that of the wireless data transceiver 201 of camera 101. An image output unit 302 projects an image data file, which has been received by the wireless data transceiver 301, on the screen 103.

A state determination unit 303, which includes a CPU for executing processing in accordance with a program and a peripheral circuit (timer), determines the state of the connection to the camera 101 by close-proximity wireless transfer technology. A storage unit 304 stores the image data file. An application unit 305 includes application software for executing archiving processing and projection processing applied to the image data file received via the wireless data transceiver 201.

Operation in which a plurality of image data files that have been stored in the storage unit 205 of camera 101 are transferred to the projection 102 in the arrangement set forth above will now be described.

Figure 4:
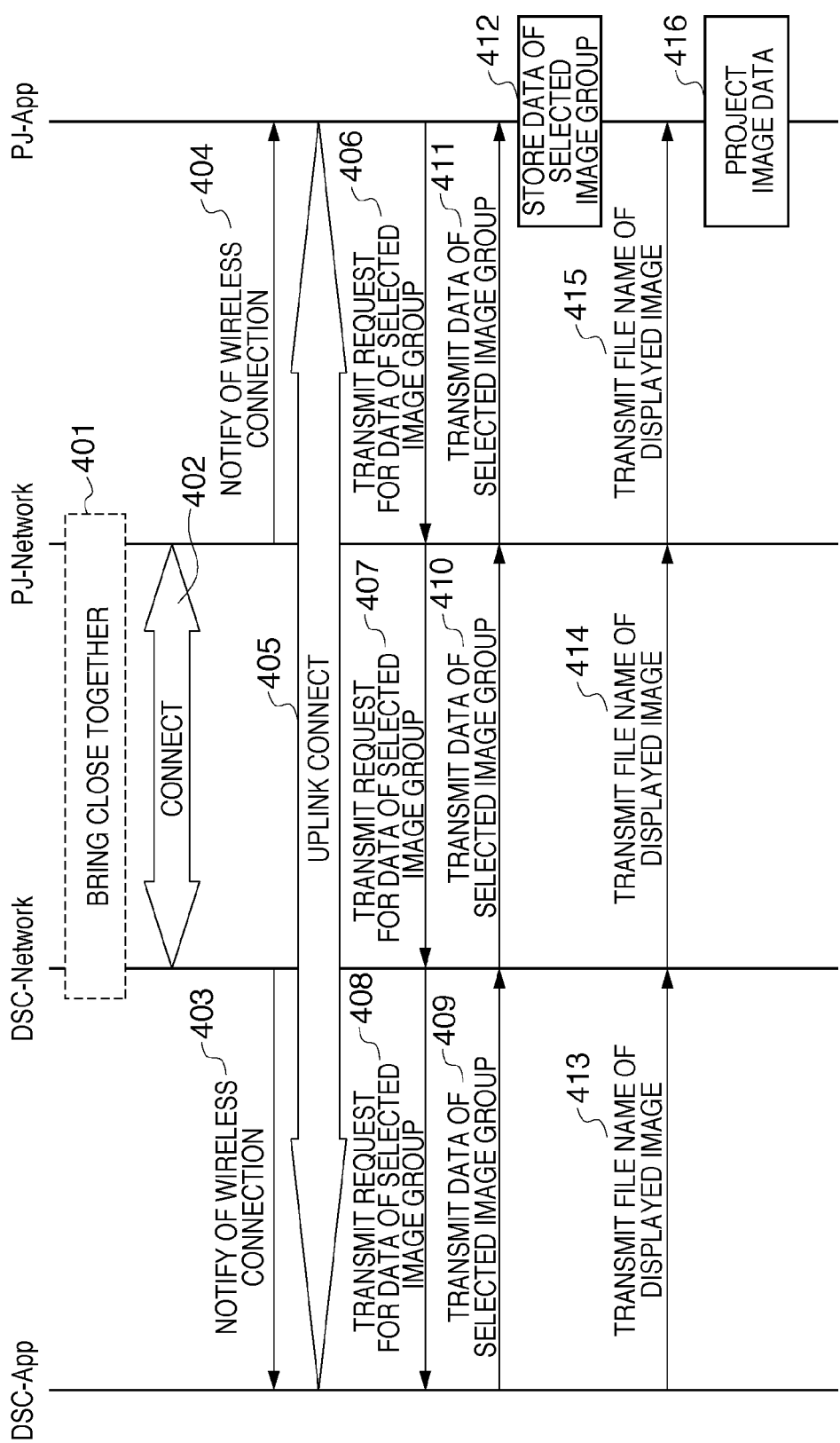
FIG. 4 is a diagram illustrating an uplink connect sequence in the first embodiment.
Figure 5:
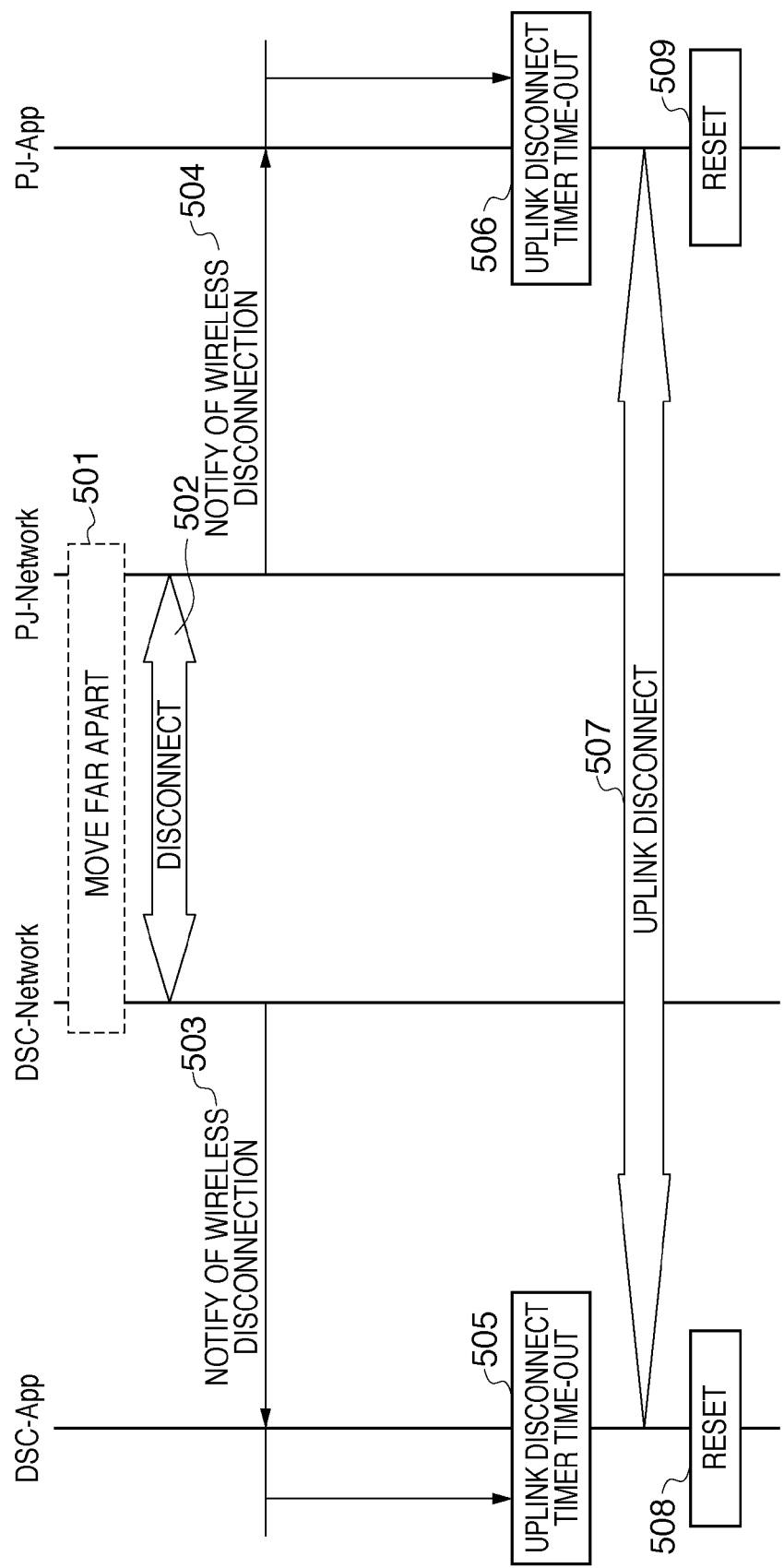
FIG. 5 is a diagram illustrating an uplink disconnect sequence in the first embodiment.
Figure 6:
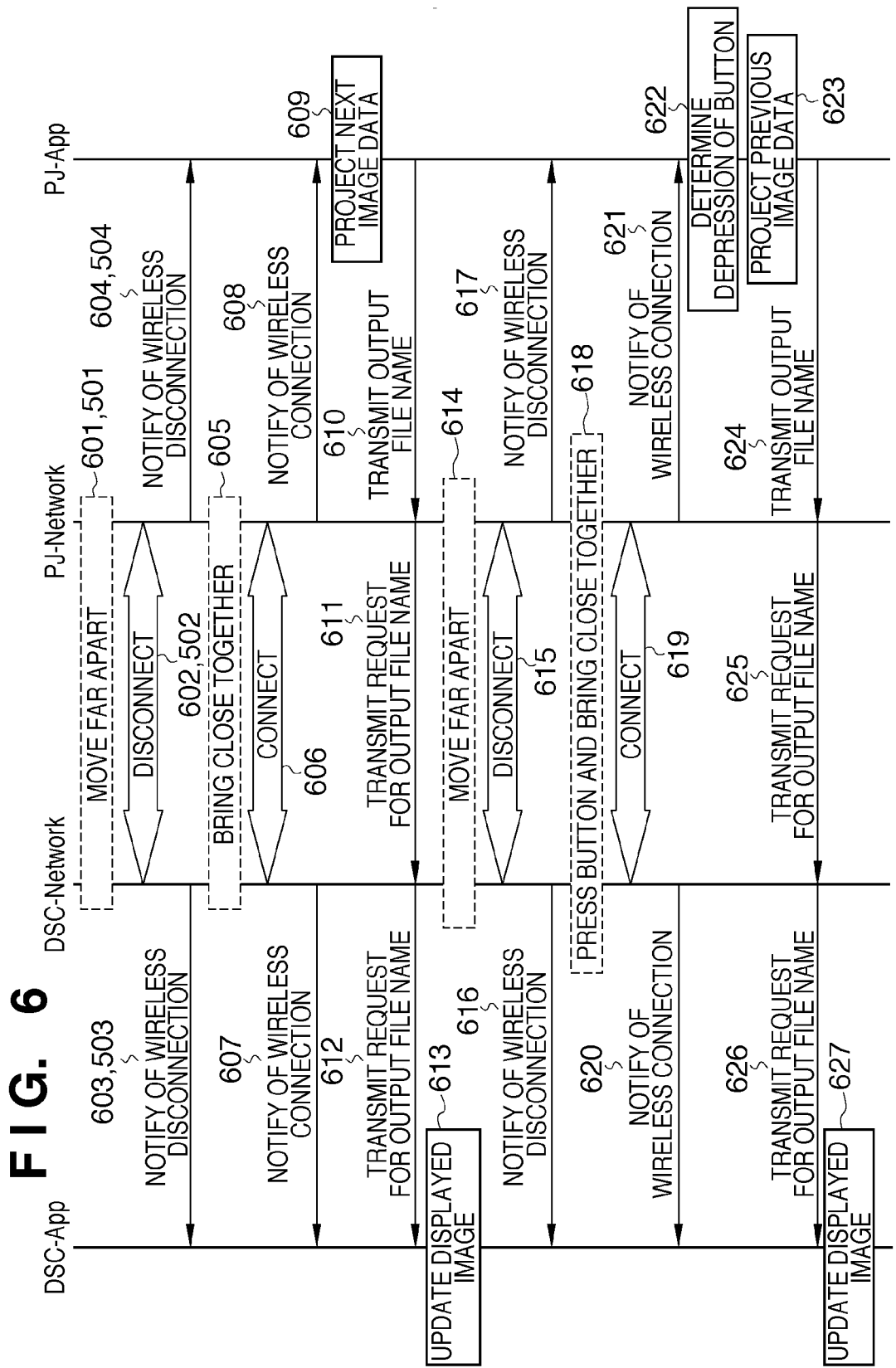
FIG. 6 is a diagram illustrating a main sequence in the first embodiment.

FIG. 4 is a diagram illustrating an uplink connect sequence in the first embodiment, FIG. 5 is a diagram illustrating an uplink disconnect sequence in the first embodiment and FIG. 6 is a diagram illustrating a main sequence in the first embodiment. In FIGS. 4 to 6, DSC-App is the application unit 206 of camera 101, and DSC-Network is the wireless data transceiver 201 of camera 101. PJ-Network is the wireless data transceiver 301 of wireless port 104, and PJ-App is the application unit 305 of projector 102.

The operation described below is performed in order for the user to project an image, which is displayed on the display unit 204 of camera 101, onto the screen 103 using the projector 102.

First, the user brings the camera 101 to within a certain fixed distance from the wireless port 104 (401). When this is done, the camera 101 and projector 102 are placed in a connected state by the close-proximity wireless transfer function (402). The application units 206 and 305 within the camera 101 and projector 102, respectively, are notified of the connected state (403, 404). Upon being so notified, the application units 206 and 305 implement an uplink connection (405) and shift to an image transfer state.

Next, when the application unit 305 of projector 102 transitions to the image transfer state, it requests the camera 101 for transfer of a group of image data files selected by the camera 101 beforehand (406 to 408). It is possible to adopt an arrangement in which the group of image data files is selected by the projector 102 or an arrangement in which transfer of all of the image data files is requested.

Upon receiving the request for transfer of the group of image data files, the camera 101 transfers the files in the same order in which they were stored in the storage unit 205 (409 to 411). The application unit 305 of projector 102 stores the transferred group of image data files in the storage unit 304 (412).

An arrangement may be adopted in which after the application unit 206 of camera 101 transitions to the image transfer state, the transfer of the group of image data files starts without a request from the side of the projector 102.

Upon completion of transfer of the group of image data files, the application unit 206 of camera 101 sends the projector 102 the name of an image data file being displayed on the display unit 204 (413 to 415). In response, using the file name received, the application unit 305 of projector 102 conducts a search among the image data files that have been stored in the storage unit 304 and projects the matching image data file onto the screen 103 from the image output unit 302 (416).

Described next will be user operation in which an image being projected onto the screen 103 is changed to the next image in the order in which it was stored in the storage unit 304 of projector 102. In the operation to be described, the camera 101 is carried away from the wireless port 104 to sever the wireless connection, after which the camera 101 is brought close to the wireless port 104 to establish the connected state within a fixed period of time.

First, the camera 101 which has been brought close to the wireless port 104 is carried away from the port so that the distance between the camera 101 and the wireless port 104 exceeds a fixed distance (501). When this is done, the camera 101 and projector 102 are placed in a disconnected state by the close-proximity wireless transfer function (502). The application units 206 and 305 within the camera 101 and projector 102, respectively, are notified of the disconnected state (503, 504). Upon being so notified, the application units 206 and 305 start uplink disconnect timers. The projector 102 suspends projection. An arrangement may be adopted in which these devices already hold the timer value or in which the timer value can be set by the user.

If the uplink disconnect timer subsequently times out (505, 506), uplink disconnect is performed (507) and the image transfer state is terminated. The application units 206, 305 then reset the setting at the time of the image transfer state (508, 509). In particular, an arrangement may be adopted in which the group of image data files that has been transferred to the storage unit 304 of projector 102 is erased.

If the camera is brought close to the wireless port 104 before the uplink disconnect timer times out (605), the camera 101 and projector 102 are again placed in the connected state (606). The application units 206 and 305 are notified of the connected state (607, 608). If the respective uplink disconnect timers have been started, the application units 206 and 305 stop the timers.

Further, upon receiving the above-mentioned notification, the application unit 305 of the projector 102 projects the next image data file, which exists in the storage unit 304, onto the screen 103 from the image output unit 302 (609). An arrangement may be adopted in which the projector 102, which has started projecting the next image data file, sends the camera 101 the file name of the image data file currently being projected (610 to 612). In this case, the image identical with that of the projected image data file is displayed on the display unit 204 of camera 101 (613). It may be so arranged that projection of the image continues when the disconnected state is established. By thus bringing the camera 101 close to the wireless port 104 and then moving it away from the wireless port 104, projected images can be changed over one after another.

Described next will be user operation when an image being projected onto the screen 103 is changed to the previous image in the order in which it was stored in the storage unit 304 of projector 102. In other words, this is an operation performed when the user wishes to have the projector 102 project the previous image that has been stored in the storage unit 205 of camera 101.

First, the camera 101 which has been brought close to the wireless port 104 is carried away from the port (614). When this done, the camera 101 and projector 102 are placed in a disconnected state by the close-proximity wireless transfer function (615). The application units 206 and 305 within the camera 101 and projector 102, respectively, are notified of the disconnected state (616, 617). Upon being so notified, the application units 206 and 305 start the uplink disconnect timers and the projector 102 suspends projection.

If while pressing a prescribed button on the control panel 207 of camera 101 the user brings the camera 101 close to the wireless port 104 before the uplink disconnect timer times out (618), then the camera 101 and storage device 102 are again placed in the connected state (619). It should be noted that it is assumed that the pressing of the button is communicated to the projector 102 from the camera 101. The application units 206, 305 are notified of the fact that the connection was established in a state in which the prescribed button of camera 101 was being pressed (620, 621). The application units 206, 305 stop the uplink disconnect timers in the camera 101 and projector 102, respectively.

Upon receiving the above-mentioned notification, the application unit 305 of the projector 102 senses the depression of the button on camera 101 from the result of a determination made by the state determination unit 303 (622). The application unit 305 of the projector 102 then projects the previous image data file, which has been stored in the storage unit 304, onto the screen 103 from the image output unit 302 (623).

It should be noted that an arrangement may be adopted in which the projector 102, which has started projecting the previous image data file, sends the camera 101 the file name of the image data file currently being projected (624 to 626). In this case, the image identical with that of the projected image data file is displayed on the display unit 204 of camera 101 (627). Thus, if the camera 101 and wireless port 104 are disconnected from each other and are then brought close together again with the prescribed button of camera 101 being pressed, the projected image can be returned to the previous image. When the camera 101 is brought close to or moved far from the wireless port 104, therefore, the projected image can be advanced or returned to the previous image depending upon whether the button on the camera 101 is or is not pressed.

Further, although the projection of an image is stopped by the projector 102 when the disconnected state is in effect, it may be so arranged that projection continues in such state.

Furthermore, although the invention has been described taking close-proximity wireless transfer technology as an example, it is possible to use connect/disconnect of a wireless technology such as Bluetooth (registered trademark) or NFC.

Further, a case where disconnect processing is executed while a button on the camera is pressed has been described. However, if a change in state, such as the camera 101 being turned upside-down and brought close to the wireless port 104 or the camera being brought close to the wireless port 104 with acceleration, can be recognized as by a sensor, then this arrangement can be adopted instead.

Thus, in accordance with the first embodiment, image data that is output by a projector can be changed to different image data in accordance with a change in the state of a wireless connection between a camera and the projector.

Second Embodiment

A second embodiment according to the present invention will now be described in detail with reference to the drawings. Described in the second embodiment is a case where electromagnetic waves (electric field intensity) in close-proximity wireless transfer are measured and image data that is output by an image output apparatus is changed in accordance with the value of electric field intensity.

It should be noted that the configuration of the wireless image output system in the second embodiment is the same as that of the first embodiment described in conjunction with FIGS. 1 to 3 and need not be described again.

Further, operation in a case where a group of image data files that has been stored in the storage unit 205 of camera 101 is transferred to the storage unit 304 of projector 102 and is then projected onto the screen 103 is the same as in the first embodiment and need not be described again.

Here it is assumed that the camera 101 is brought close to the wireless port 104 to establish the connection with the projector 102 and that a threshold value of electric field intensity used to determine whether the camera 101 is near or far has been set in the projector 102 beforehand.

Further, it is assumed that measurement of the value of electric field intensity prevailing when electric waves are received is performed by the wireless data transceiver 301 of wireless port 104. This measurement may be performed by a well-known method and need not be described here.

Figure 7:
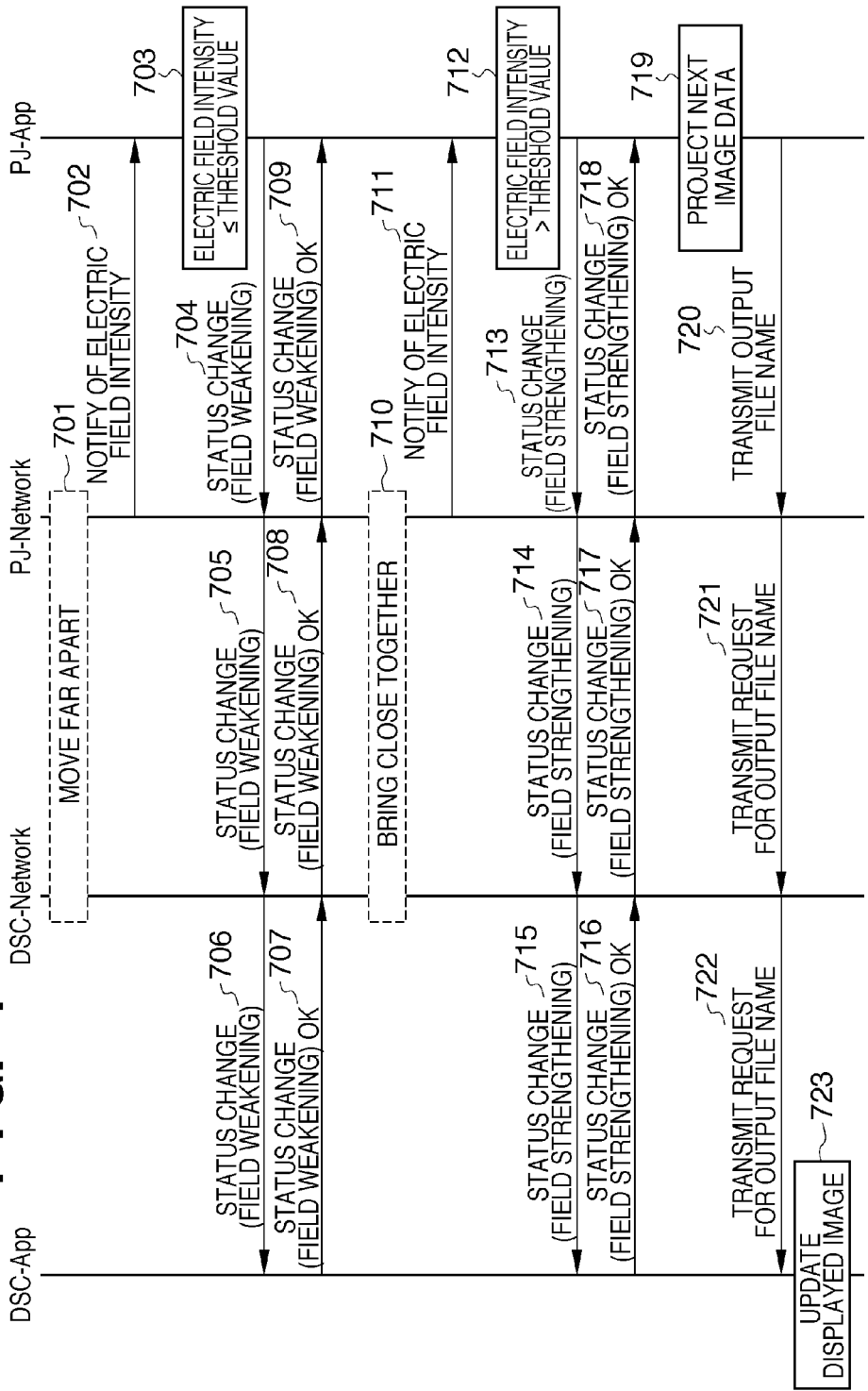
FIG. 7 is a diagram illustrating a main sequence according to a second embodiment of the present invention.

FIG. 7 is a diagram illustrating a main sequence according to the second embodiment. The operation described below is performed in a case where the user desires the projector 102 to project the next image that has been stored in the storage unit 205 of camera 101.

The camera 101, which has been brought close to the wireless port 104, is carried far enough away to disconnect it from the wireless port 104 (701). When this is done, the wireless port 104 notifies the application unit 305 of projector 102 of the value of the electric field intensity and the application unit 305 receives this value (702). The timing of this notification may be a fixed time interval or any time in a case where there is a change in state.

The state determination unit 303 of projector 102 compares a previously set threshold value and the field intensity value of which notification has been given. If the field intensity value is equal to or less than the threshold value (703), the status of the image output system is changed. More specifically, a status-change (weakening of the electric field) message is transmitted from the application unit 305 of projector 102 to the wireless data transceiver 301 of wireless port 104 (704). The message is transmitted (706) by the close-proximity wireless transfer technology function to the application unit 206 of camera 101 via the wireless data transceiver 201 of camera 101 (705).

On the other hand, upon receiving the status-change (weakening of the electric field) message, the application unit 206 of camera 101 transmits an answer message to the application unit 305 of projector 102 (707 to 709). The application units 206 and 305 each change status and start an uplink disconnect timer. The projector 102 suspends projection. An arrangement may be adopted in which these devices already hold the timer value or in which the timer value can be set by the user.

Further, if the user brings the camera 101 near the wireless port 104 before the uplink disconnect timers time out (710), the application unit 305 of projector 102 is notified of the value of electric field intensity (711). As a result, the state determination unit 303 of projector 102 compares this value with the threshold value again. If the field intensity value is greater than the threshold value (712), the status of the image output system is changed. In other words, a status-change (strengthening of the electric field) message is transmitted from the application unit 305 of projector 102 to the wireless data transceiver 301 of wireless port 104 (713). The message is transmitted (715) by the close-proximity wireless transfer technology function to the application unit 206 of camera 101 via the wireless data transceiver 201 of camera 101 (714).

On the other hand, upon receiving the status-change (strengthening of the electric field) message, the application unit 206 of camera 101 transmits an answer message to the application unit 305 of projector 102 (716 to 718). The application units 206 and 305 each change status and stop the uplink disconnect timer.

Next, upon receiving the status-change (strengthening of the electric field) message, the application unit 305 of projector 102 projects the next image data file, which has been stored in the storage unit 304, upon the screen 103 from the image output unit 302 (719). It may be so arranged that the projector 102, which has started projecting the next image data file, sends the camera 101 the file name of the image data file currently being projected (720 to 722). In this case, an image identical with that of the projected image data file is displayed on the display unit 204 of camera 101 (723).

An arrangement may be adopted in which projection of an image continues when the status of the projector 102 has been changed (to the weakened-field state).

Other processing in the second embodiment is similar to that of the first embodiment and need not be described again. Specifically, if the prescribed button on the control panel 207 is pressed and the camera 101 is brought close to the wireless port 104 or moved far from the wireless port 104, the projected image can be returned to the previous image.

In accordance with the second embodiment, it is possible for an image projected onto a screen from a projector to be changed to a different image in accordance with the value of electric field intensity of a wireless transmission.

Third Embodiment

A third embodiment according to the present invention will now be described in detail with reference to the drawings. Described in the third embodiment is a case where an image data file that is output by an image output apparatus is changed in accordance with a wireless connection method that employs the close-proximity wireless transfer function.

It should be noted that the configuration of the wireless image output system in the third embodiment is the same as that of the first embodiment described in conjunction with FIGS. 1 to 3 and need not be described again.

Figure 8:
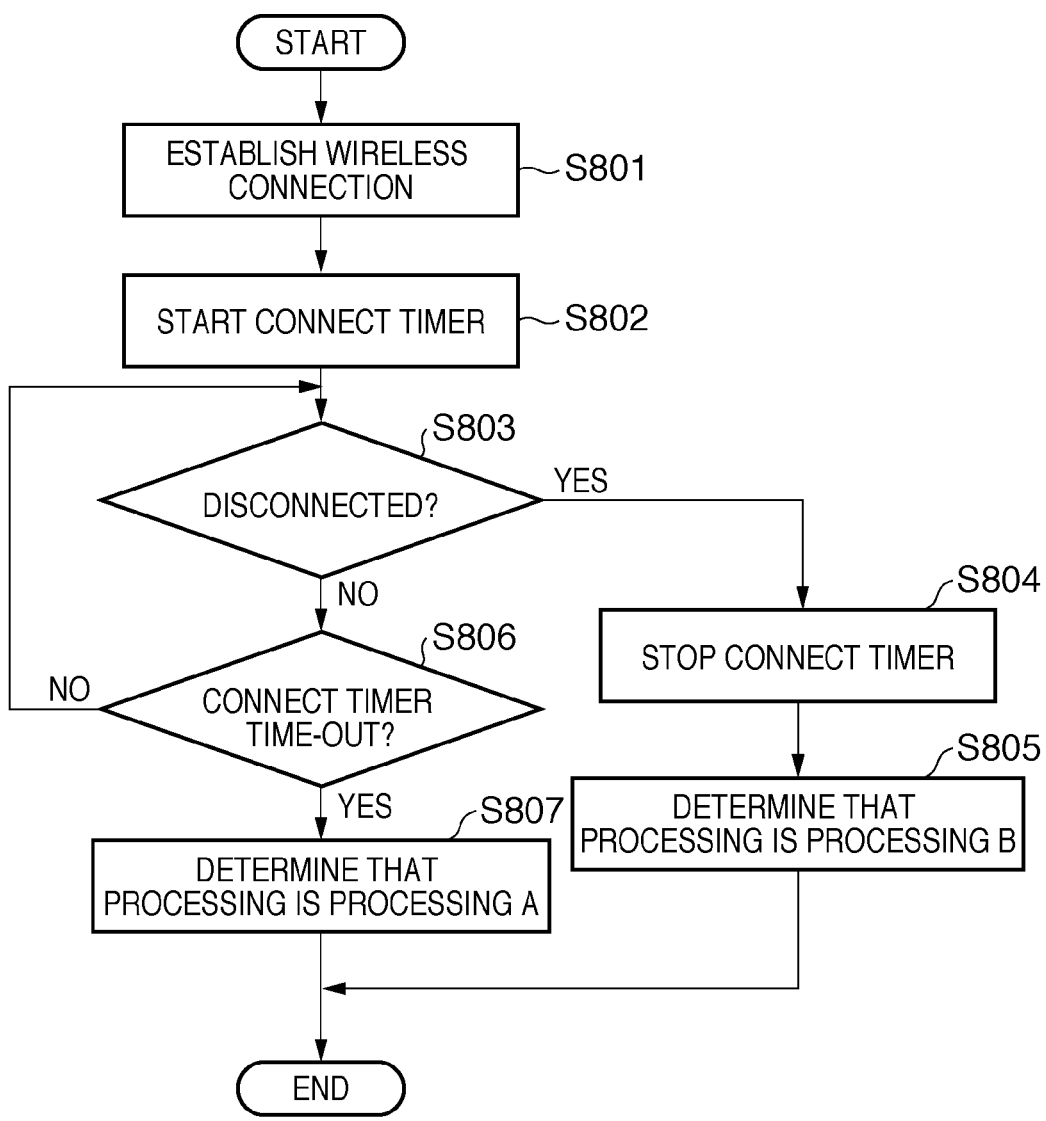
FIG. 8 is a flowchart illustrating determination processing in a wireless connection method according to a third embodiment of the present invention.

FIG. 8 is a flowchart illustrating determination processing in a wireless connection method according to the third embodiment. It should be noted that this determination processing is processing executed by the application unit 206 of camera 101 and by the application unit 305 of projector 102. The wireless connection method will be described taking contact processing A and contact processing B as examples.

First, in step S801, the wireless data transceiver 201 of camera 101 and the wireless data transceiver 301 of wireless port 104 establish a wireless connection. When the connection is completed, the application unit 206 of camera 101 and the application unit 305 of projector 102 start up connect timers that monitor connection maintenance time (S802). It is assumed that the time-out values are held by respective ones of the camera 101 and projector 102.

Next, the application units 206 and 305 determine whether the connection has been severed before the respective connect timers time out (S803 and S806). If it is determined that the connection has been severed before the respective connect timers time out, control proceeds to step S804 and the connect timers are stopped. Next, in step S805, it is determined that the processing is contact processing B. Specifically, contact processing B severs the connection immediately after the wireless connection is established.

On the other hand, if it is found in step S803 that the connection is continuing to be maintained and in step S806 that the connect timers have timed out, then control proceeds to step S807. Here the application units 206 and 305 determine that the processing is contact processing A. It should be noted that an arrangement is possible in which the time-out value can be set beforehand by the user.

Figure 9:
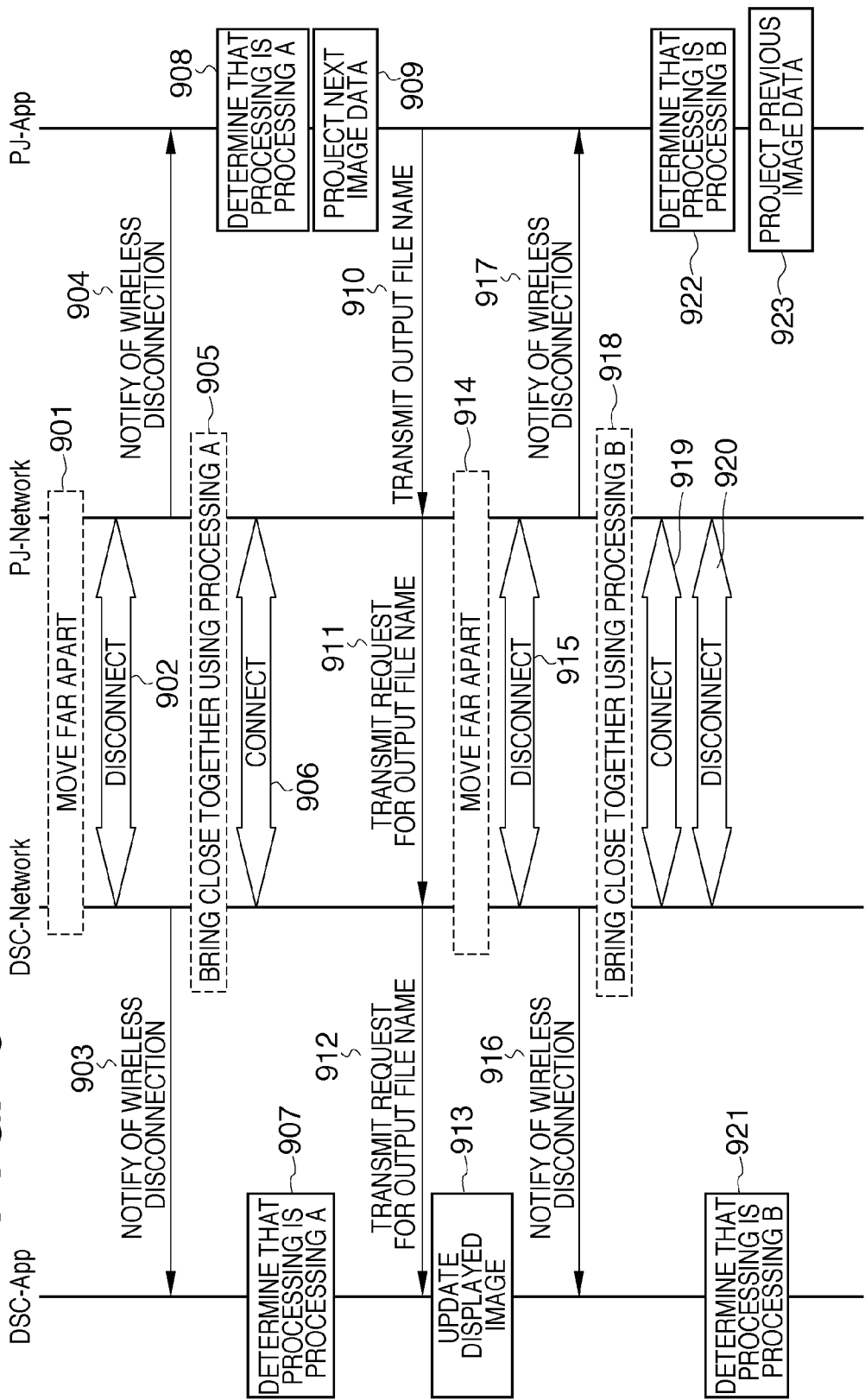
FIG. 9 is a diagram illustrating a main sequence in the third embodiment.

Here processing for changing an image projected by the image output signal using the contact processing set forth above will be described. Operation in a case where a group of image data files in the storage unit 205 of camera 101 is transferred to the storage unit 304 of projector 102 and image data on the display unit 204 of camera 101 is projected onto the screen via the projector 102 is similar to that of the first embodiment. Reference will now be had to FIG. 9 to describe a case where the user projects the next image, which has been stored in the storage unit 205 of camera 101, onto the screen via the projector 102.

FIG. 9 is a diagram illustrating a main sequence in the third embodiment. First, the camera 101 which has been brought close to the wireless port 104 is carried away from the port (901). When this is done, the camera 101 and projector 102 are placed in a disconnected state by the close-proximity wireless transfer function (902). The application units 206 and 305 within the camera 101 and projector 102, respectively, are notified of the disconnected state (903, 904). Upon being so notified, the application units 206 and 305 start uplink disconnect timers. The projector 102 suspends projection. An arrangement may be adopted in which these devices already hold the timer value or in which the timer value can be set by the user.

On the other hand, if the user brings the camera 101 close to the wireless port 104 using contact processing A before the uplink disconnect timers time out (905), the camera 101 and projector 102 attain the connected state again (906). Accordingly, the application units 206 and 305 determine the contact processing (907, 908) and stop the respective uplink disconnect timers.

If it is determined that the processing is contact processing A, then the application unit 305 of projector 102 projects the next image data file, which has been stored in the storage unit 304, onto the screen 103 from the image output unit 302 (909). It may be so arranged that the projector 102, which has started projecting the next image data file, sends the camera 101 the file name of the image data file currently being projected (910 to 912). In this case, the image identical with that of the projected image data file is displayed on the display unit 204 of camera 101 (913). It may be so arranged that projection of the image continues when the disconnected state is in effect.

Described next will be processing in a case where the user wishes to have the projector 102 project onto the screen 103 the previous image that has been stored in the storage unit 205 of camera 101.

First, the camera 101 which has been brought close to the wireless port 104 is carried away from the port (914). When this done, the camera 101 and projector 102 are placed in a disconnected state by the close-proximity wireless transfer function (915). The application units 206 and 305 within the camera 101 and projector 102, respectively, are notified of the disconnected state (916, 917). Upon being so notified, the application units 206 and 305 start the uplink disconnect timers and the projector 102 suspends projection.

If the user brings the camera 101 close to the wireless port 104 using contact processing B before the uplink disconnect timers time out (918), the camera 101 and projector 102 attain the connected state again (919) but then immediately revert to the disconnected state (920). The application units 206 and 305 determine the contact processing (921, 922) and stop the respective uplink disconnect timers. It should be noted that although notification of the wireless connection and notification of the wireless disconnection are not illustrated in FIG. 9, it is possible to adopt an arrangement in which such notification is given.

The application unit 305 of projector 102 that has determined that processing is contact processing B reads in the previous image data file from the storage unit 205 and projects it upon the screen 103 from the image output unit 302 (923).

Other processing in the third embodiment is similar to that of the first and second embodiments and need not be described again.

In accordance with the third embodiment, a projected image can be changed to a different image in accordance with how long the wireless connection between the camera 101 and projector 102 is maintained until the connection is severed.

The present invention may be applied to a system constituted by a plurality of devices (e.g., a host computer, interface, reader, printer, etc.) or to an apparatus comprising a single device (e.g., a copier or facsimile machine, etc.).

Further, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Further, by executing the program codes read out by the computer, not only are the functions of the embodiments implemented but the following case is included in the present invention as well: Specifically, an operating system or the like running on the computer executes some or all of the actual processing based upon the indications in the program codes, and the functions of the above-described embodiments are implemented by this processing.

Furthermore, it goes without saying that the following case also is included in the present invention. Specifically, program code read from a recording medium is written to a memory provided on a function expansion board inserted into the computer or provided in a function expansion unit connected to the computer. Thereafter, a CPU or the like provided on the function expansion board or function expansion unit performs some or all of actual processing based upon the indication in the program codes, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171245, filed Jun. 30, 2008, which is hereby incorporated by reference herein in its entirety.

The invention claimed is:

1. A communication apparatus comprising:
a wireless communication unit;
a detection unit configured to detect that a first wireless connection, which is a wireless connection established by using the wireless communication unit, with a first mobile device is disconnected;
a first determination unit configured to determine whether a second wireless connection, which is a wireless connection established by using the wireless communication unit, with the first mobile device is established after it is detected that the first wireless connection with the first mobile device is disconnected; and
an output unit configured to output second data different from first data, the first data being output before the detection by the detection unit, in accordance with the determination by the first determination unit, wherein the output unit is different from the wireless communication unit.

2. The communication apparatus according to claim 1, further comprising:
a confirmation unit configured to confirm a state of an operation unit of the first mobile device in a case the second wireless connection is established after the first wireless connection is disconnected; and
a second determination unit configured to determine, if the determination is made by the first determination unit, whether to output the second data or third data different from the second data by the output unit based on the state of the operation unit confirmed by the confirmation unit.

3. The communication apparatus according to claim 2, further comprising:
a storage unit configured to store a plurality of data, the plurality of data being sorted by a predetermined criteria,
wherein the second data is sorted in an order following the first data, and the third data is sorted in an order prior to the first data.

4. The communication apparatus according to claim 1, further comprising:
a measurement unit configured to measure a time period of a connecting condition of the first wireless connection with the first mobile device until it is detected that the first wireless connection is disconnected; and
a second determination unit configured to determine, if the determination is made by the first determination unit, whether to output the second data or third data different from the second data by the output unit based on the time period measured by the measurement unit.

5. The communication apparatus according to claim 1, further comprising:
a notification unit configured to notify the first mobile device of the data output by the output unit.

6. The communication apparatus according to claim 1, wherein the output of data by the output unit comprises displaying the data.

7. The communication apparatus according to claim 1, further comprising:

a memory configured to store the first data and the second data.

8. The communication apparatus according to claim 1, further comprising:
a reception unit configured to receive the first data and the second data from the first mobile device.

9. The communication apparatus according to claim 1, wherein the first wireless connection and the second wireless connection are used a NFC (Near Filed Communication).

10. The communication apparatus according to claim 1, further comprising:
a measurement unit configured to measure a time period of a connecting condition of a first wireless connection with the first mobile device until it is detected that the first electric field intensity is less than the predetermined value; and
a second determination unit configured to determine, if the determination is made by the first determination unit, whether to output the second data or third data different from the second data by the output unit based on the time period measured by the measurement unit.

11. The communication apparatus according to claim 1, wherein the second data is received before the second wireless connection is established.

12. The communication apparatus according to claim 1, wherein the first wireless connection is disconnected if the distance between the communication apparatus and the first mobile device becomes distant, and the first wireless connection is established if the distance between the communication apparatus and the first mobile device becomes close after the first wireless connection is disconnected.

13. A method of controlling a communication apparatus comprising a wireless communication unit and an output unit, the method comprising the steps of:
detecting that a first wireless connection, which is a wireless connection established by using the wireless communication unit, with a first mobile device is disconnected;
determining whether a second wireless connection, which is a wireless connection established by using the wireless communication unit, with the first mobile device is established after it is detected that the first wireless connection with the first mobile device is disconnected; and
outputting by the output unit second data different from first data, the first data being output before the detection in the detecting step, in accordance with the determination in the determining step, wherein the output unit is different from the wireless communication unit.

14. A non-transitory computer-readable storage medium storing a computer program for causing a communication apparatus to execute the method according to claim 13.

* * * * *